(12) United States Patent
Twitchell, Jr.

(10) Patent No.: US 7,529,547 B2
(45) Date of Patent: May 5, 2009

(54) USING WAKE-UP RECEIVERS FOR SOFT HAND-OFF IN WIRELESS COMMUNICATIONS

(75) Inventor: Robert W. Twitchell, Jr., Cumming, GA (US)

(73) Assignee: Terahop Networks, Inc., Alpharetta, GA (US)

( * ) Notice: Subject to any disclaimer, the term of this patent is extended or adjusted under 35 U.S.C. 154(b) by 579 days.

(21) Appl. No.: 11/422,329

(22) Filed: Jun. 5, 2006

(65) Prior Publication Data

US 2006/0274698 A1    Dec. 7, 2006

Related U.S. Application Data

(60) Provisional application No. 60/687,415, filed on Jun. 3, 2005, provisional application No. 60/691,884, filed on Jun. 17, 2005.

(51) Int. Cl.
*H04W 36/00* (2006.01)
*H04B 7/00* (2006.01)
*H04W 4/00* (2006.01)

(52) U.S. Cl. .................. 455/442; 455/41.2; 370/338

(58) Field of Classification Search .................. 455/442; 370/338
See application file for complete search history.

(56) References Cited

U.S. PATENT DOCUMENTS

| | | | |
|---|---|---|---|
| 4,613,990 A | 9/1986 | Halpern | |
| 4,680,583 A | 7/1987 | Grover | |
| 5,040,238 A | 8/1991 | Comroe et al. | |
| 5,117,501 A | 5/1992 | Childress et al. | |
| 5,129,096 A | 7/1992 | Burns | |
| 5,210,540 A | 5/1993 | Masumoto | |
| 5,265,025 A | 11/1993 | Hirata | |
| 5,295,154 A | 3/1994 | Meier et al. | |
| 5,331,637 A | 7/1994 | Francis et al. | |
| 5,369,784 A | 11/1994 | Nelson | |
| 5,400,254 A | 3/1995 | Fujita | |
| 5,425,051 A | 6/1995 | Mahany | |
| 5,442,758 A | 8/1995 | Slingwine et al. | |
| 5,511,232 A | 4/1996 | O'Dea et al. | |

(Continued)

FOREIGN PATENT DOCUMENTS

EP    0467036 A2    1/1992

(Continued)

OTHER PUBLICATIONS

"Scalable Routing Strategies for Ad hoc Wireless Networks", Atsushi Iwata et al., IEEE Journal on Selected Areas in Communications, Special Issue on Adhoc Networks, Aug. 1999, pp. 1369-1379.

(Continued)

*Primary Examiner*—Nick Corsaro
*Assistant Examiner*—Amanuel Lebassi
(74) *Attorney, Agent, or Firm*—Tillman Wright, PLLC; Chad D. Tillman; James D. Wright

(57) ABSTRACT

Multiple standards based radio ("SBR") devices, each having a high-gain directional antenna, are utilized in a remote sensor interface ("RSI") unit to optimize detection and reception by the RSI of radio signals from gateway controllers, hopping radios, and other wireless devices.

26 Claims, 24 Drawing Sheets

U.S. PATENT DOCUMENTS

| | | | |
|---|---|---|---|
| 5,579,306 A | 11/1996 | Dent | |
| 5,590,409 A | 12/1996 | Sawahashi et al. | |
| 5,596,652 A | 1/1997 | Piatek et al. | |
| 5,604,892 A | 2/1997 | Nuttall et al. | |
| 5,640,151 A | 6/1997 | Reis et al. | |
| 5,652,751 A | 7/1997 | Sharony | |
| 5,682,379 A | 10/1997 | Mahany et al. | |
| 5,686,902 A | 11/1997 | Reis et al. | |
| 5,732,077 A | 3/1998 | Whitehead | |
| 5,761,195 A | 6/1998 | Lu et al. | |
| 5,790,946 A * | 8/1998 | Rotzoll | 455/343.1 |
| 5,793,882 A | 8/1998 | Piatek et al. | |
| 5,833,910 A | 11/1998 | Teixido | |
| 5,890,054 A | 3/1999 | Logsdon et al. | |
| 5,907,491 A | 5/1999 | Canada et al. | |
| 5,917,423 A | 6/1999 | Duvall | |
| 5,939,982 A | 8/1999 | Gagnon et al. | |
| 5,943,610 A | 8/1999 | Endo | |
| 5,950,124 A | 9/1999 | Trompower et al. | |
| 5,974,236 A | 10/1999 | Sherman | |
| 5,977,913 A | 11/1999 | Christ | |
| 6,005,884 A | 12/1999 | Cook et al. | |
| 6,006,100 A | 12/1999 | Koenck et al. | |
| 6,072,784 A | 6/2000 | Agrawal et al. | |
| 6,078,789 A | 6/2000 | Bodenmann et al. | |
| 6,091,724 A | 7/2000 | Chandra et al. | |
| 6,097,707 A | 8/2000 | Hodzic et al. | |
| 6,104,512 A | 8/2000 | Batey, Jr. et al. | |
| 6,118,988 A | 9/2000 | Choi | |
| 6,125,306 A | 9/2000 | Shimada et al. | |
| 6,127,976 A | 10/2000 | Boyd et al. | |
| 6,134,587 A | 10/2000 | Okanoue | |
| 6,192,400 B1 | 2/2001 | Hanson et al. | |
| 6,198,913 B1 | 3/2001 | Sung et al. | |
| 6,201,974 B1 | 3/2001 | Lietsalmi et al. | |
| 6,256,303 B1 | 7/2001 | Drakoulis et al. | |
| 6,313,745 B1 | 11/2001 | Suzuki | |
| 6,354,493 B1 | 3/2002 | Mon | |
| 6,360,169 B1 | 3/2002 | Dudaney | |
| 6,381,467 B1 | 4/2002 | Hill et al. | |
| 6,404,082 B1 | 6/2002 | Rasinski et al. | |
| 6,405,102 B1 | 6/2002 | Swartz et al. | |
| 6,409,082 B1 | 6/2002 | Davis et al. | |
| 6,418,299 B1 | 7/2002 | Ramanathan | |
| 6,424,260 B2 | 7/2002 | Maloney | |
| 6,424,264 B1 | 7/2002 | Giraldin et al. | |
| 6,427,913 B1 | 8/2002 | Maloney | |
| 6,473,607 B1 | 10/2002 | Shohara et al. | |
| 6,512,478 B1 | 1/2003 | Chien | |
| 6,529,142 B2 | 3/2003 | Yeh et al. | |
| 6,542,114 B1 | 4/2003 | Eagleson et al. | |
| 6,547,137 B1 | 4/2003 | Begelfer et al. | |
| 6,559,620 B2 | 5/2003 | Zhou et al. | |
| 6,600,418 B2 | 7/2003 | Francis et al. | |
| 6,611,556 B1 | 8/2003 | Koener et al. | |
| 6,614,349 B1 | 9/2003 | Proctor et al. | |
| 6,665,585 B2 | 12/2003 | Kawase | |
| 6,700,533 B1 | 3/2004 | Werb et al. | |
| 6,720,888 B2 | 4/2004 | Eagleson et al. | |
| 6,737,974 B2 | 5/2004 | Dickinson | |
| 6,745,027 B2 | 6/2004 | Twitchell, Jr. | |
| 6,747,562 B2 | 6/2004 | Giraldin et al. | |
| 6,753,775 B2 | 6/2004 | Auerbach et al. | |
| 6,760,578 B2 | 7/2004 | Rotzoll | |
| 6,761,312 B2 | 7/2004 | Piatek et al. | |
| 6,765,484 B2 | 7/2004 | Eagleson et al. | |
| 6,816,063 B2 | 11/2004 | Kubler et al. | |
| 6,847,892 B2 | 1/2005 | Zhou et al. | |
| 6,934,540 B2 | 8/2005 | Twitchell, Jr. | |
| 6,940,392 B2 | 9/2005 | Chan et al. | |
| 6,975,614 B2 | 12/2005 | Kennedy | |
| 7,012,529 B2 | 3/2006 | Sajkowsky | |
| 7,027,773 B1 | 4/2006 | McMillin | |
| 7,098,784 B2 | 8/2006 | Easley et al. | |
| 7,126,470 B2 | 10/2006 | Clift et al. | |
| 7,133,704 B2 | 11/2006 | Twitchell, Jr. | |
| 7,142,121 B2 | 11/2006 | Chan et al. | |
| 7,155,264 B2 | 12/2006 | Twitchell, Jr. | |
| 7,191,934 B2 | 3/2007 | Miller et al. | |
| 7,200,132 B2 | 4/2007 | Twitchell, Jr. | |
| 7,209,468 B2 | 4/2007 | Twitchell, Jr. | |
| 7,209,771 B2 | 4/2007 | Twitchell, Jr. | |
| 7,221,668 B2 | 5/2007 | Twitchell, Jr. | |
| 2001/0000019 A1 | 3/2001 | Bowers et al. | |
| 2002/0039896 A1 | 4/2002 | Brown | |
| 2002/0098861 A1 | 7/2002 | Doney et al. | |
| 2002/0119770 A1 | 8/2002 | Twitchell, Jr. | |
| 2002/0146985 A1 | 10/2002 | Naden | |
| 2003/0083064 A1 | 5/2003 | Cooper | |
| 2003/0141973 A1 | 7/2003 | Yeh et al. | |
| 2003/0144020 A1 | 7/2003 | Challa et al. | |
| 2003/0179073 A1 | 9/2003 | Ghazarian | |
| 2003/0209601 A1 | 11/2003 | Chung | |
| 2004/0021572 A1 | 2/2004 | Schoen et al. | |
| 2004/0041731 A1 | 3/2004 | Hisano | |
| 2004/0077383 A1 * | 4/2004 | Lappetelainen et al. | 455/574 |
| 2004/0082296 A1 | 4/2004 | Twitchell, Jr. | |
| 2004/0100415 A1 | 5/2004 | Veitch et al. | |
| 2004/0121793 A1 | 6/2004 | Weigele et al. | |
| 2004/0135691 A1 | 7/2004 | Duron et al. | |
| 2004/0183673 A1 | 9/2004 | Nageli | |
| 2005/0043068 A1 | 2/2005 | Shohara et al. | |
| 2005/0093702 A1 | 5/2005 | Twitchell, Jr. | |
| 2005/0093703 A1 | 5/2005 | Twitchell, Jr. | |
| 2005/0215280 A1 | 9/2005 | Twitchell, Jr | |
| 2005/0226201 A1 | 10/2005 | McMillin | |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 1317733 A2 | 6/2003 |
| EP | 1692599 A2 | 8/2006 |
| EP | 1692668 A2 | 8/2006 |
| WO | WO0068907 | 11/2000 |
| WO | WO0069186 | 11/2000 |

OTHER PUBLICATIONS

"Cluster Based Routing Protocol", Internet-Draft Mingliang, Jiang et al., National University of Singapore, Jul. 1999.

Gary Morgan, Miniature Tags Provide Visibility & Cohesion for an LIA Battalion Level 'Proof of Principle', Pacific NW National Laboratory, Apr. 2001, Gary.morgan@pnl.gov.

Ben Sommer et al., Group 4, Passive RF Tags.

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages, 1999.

http://www/iprg/nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAVs, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

http://www.cs.ucla.edu/NRL/wireless/PAPER/draft-ieft-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, Ad Hoc Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks: The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth-The Universal Radio Interface for Ad Hoc, Wireless Connectivity, Ericsson Review No. 3, pp. 110-117, 1998.

Ezio Valdevit, Cascading in Fibre Channel: How to Build a Multi-Switch Fabric, pp. 1-12.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

Stojmenovic et al., Design Giudelines for Routing Protocols in Ad Hoc and Sensor Networks with a Realistic Physical Layer, Communications Magazine, IEEE, vol. 43, Issue 3, Mar. 2005, pp. 101-106.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.

* cited by examiner

USING WAKE-UP RECEIVERS FOR SOFT HAND-OFF IN WIRELESS COMMUNICATIONS

I. CROSS-REFERENCE TO RELATED APPLICATION

This application is entitled to the benefit of, and claims priority to, provisional U.S. Patent Application Ser. No. 60/687,415 filed Jun. 3, 2005 and titled "CLASS-BASED SOFT HAND-OFF IN WIRELESS COMMUNICATIONS," and provisional U.S. Patent Application Ser. No. 60/691,884 filed Jun. 17, 2005 and titled "REMOTE SENSOR INTERFACE (RSI) STEPPED WAKE-UP SEQUENCE," the entirety of each of which is incorporated herein by reference.

II. INCORPORATION BY REFERENCE

The present application hereby incorporates by reference: U.S. Pat. No. 6,753,775 B2 (titled "Smart Container Monitoring System"); U.S. Pat. No. 6,745,027 B2 (titled "Class Switched Networks for Tracking Articles"); U.S. Pat. No. 6,665,585 B2 (titled "Method and Apparatus for Container Management"); U.S. Pat. No. 5,458,042 (titled "Container for Packaging an Object Provided with a Radio Frequency Transmission Device and Removable Element for Such a Container"); International Patent Application Publication No. WO 03/032501 A2, which international patent application designated the United States and was published in English (titled "Network Formation in Asset-Tracking System Based on Asset Class"); International Patent Application Publication No. WO 03/098851 A1, which international patent application designated the United States and was published in English (titled "LPRF Device Wake Up Using Wireless Tag"); U.S. Patent Application Publication No. 2004/0082296 A1; U.S. Patent Application Publication No. 2004/0183673 A1; U.S. Patent Application Publication No. 2004/0021572 A1 ("Electronic baggage tracking and identification"); and U.S. patent application Ser. No. 11/306,765 (titled "Keyhole Communication Device for Tracking and Monitoring Shipping Container and Contents Thereof").

III. COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

IV. BACKGROUND OF THE PRESENT INVENTION

The present invention generally relates to an assembly comprising a remote sensor interface and a plurality of selectable two-way wireless communication devices, and, in particular, to a method and assembly for selecting one of a plurality of two-way wireless communication devices on the basis of one or more wake-up receivers.

RSIs are utilized for remotely collecting data in the field and communicating the collected data to one or more centralized locations. For example, RSIs are utilized in tracking and/or monitoring assets that are stored and/or transported in association with wireless transceivers, such as radio frequency identification tags (RFIDs). In such implementations, such as those described in U.S. Patent Application Publication No. 2005/0093702 A1, an RSI has sometimes been previously referred to as a "wireless reader tag" or "WRT." The data regarding the tracked and/or monitored assets is communicated by an RSI to one or more central servers for processing. Such data is useful, for instance, in supply chain management. Such data further is useful, for instance, in homeland security, especially when the assets being tracked and/or monitored are being imported into the United States from foreign countries.

Of course, the RSIs of the present invention are preferably capable of wireless communications with external devices. For example, the RSI preferably communicates with other RSIs in forming one or more wireless networks. Furthermore, the RSI preferably communicates with a gateway that itself serves as a bridge to other networks, such as the Internet, a cellular network, or a Satellite network.

Unfortunately, wireless communications in urban environments can pose difficult and unpredictable challenges. Signal fading, multi-path transmission routes and reflections, environmental conditions, and other complications can cause radio signal degradations to occur thereby impairing radio communications. Low signal strengths, cancellations, and attenuations as signals propagate through construction materials impair signal reception by a wireless device. The US military has called for initiatives to address these issues due to problems experienced in urban combat environments.

One approach to solving some of these problems is to utilize a plurality of wireless communication devices arrayed to maximize the possibility that at least one of the devices is able to maintain wireless communication with a gateway, another device, or the like. Such an approach may be enhanced using, for example, high gain directional antennas arranged to provide overlapping patterns of coverage. Unfortunately, devoting multiple radios or other wireless communication devices to a single RSI results in considerably greater power consumption, among other problems. Power consumption could be reduced, however, if the RSI could select an individual radio for carrying out wireless communications on behalf of the RSI based on strength of signal and other criteria, and could hold radios in a standby mode when signals not directed specifically to that RSI are received. Thus, a need exists for a system and method for selecting one of a plurality of two-way wireless communication devices, particularly for use by an RSI in carrying out wireless communications, on the basis of determinations made by one or more wake-up receivers.

V. SUMMARY OF THE INVENTION

The present invention includes many aspects and features.

In an aspect of the invention, a method of facilitating a soft hand-off in wireless communications comprises the steps of providing a first wireless component and a second wireless component, the second wireless component including a controller and first and second low power radio systems; receiving, at a wake-up receiver of the first low power radio system in the second wireless component, a first wake-up signal; in response to receiving the first wake-up signal, sending a first electronic signal to the controller; in response to receiving the first electronic signal at the controller, activating a two-way wireless communication device of the first low power radio system, thereby facilitating two-way wireless communication with the first wireless component; receiving, at a wake-up receiver of the second low power radio system in the second wireless component, a second wake-up signal; in response to receiving the second wake-up signal, sending a second electronic signal to the controller; and in response to receiving the second electronic signal at the controller, activating a two-way wireless communication device of the second low power radio system and deactivating the two-way wireless communication device of the first low power radio system, thereby facilitating two-way wireless communication with the first wireless component.

In a feature of this aspect, the step of sending the first electronic signal to the controller is conditioned on the first wake-up signal including a class designation corresponding to the second wireless component.

In another feature of this aspect, each two-way wireless communication device is a standards based radio. In an additional feature, each standards based radio is a Bluetooth radio.

In yet another feature of this aspect, the step of providing a second wireless component includes providing a second wireless component having a first directional antenna connected to the first low power radio system and a second directional antenna connected to the second low power radio system.

In still another feature of this aspect, one or more of the steps of the method may be omitted during partial performance of the method.

In another aspect of the invention, a remote sensor interface comprises a sensor input adapted to receive data from a sensor device; a plurality of low power radio systems, each including a two-way wireless communication device and a wake-up receiver; and a controller, connected to each wake-up receiver to receive signals therefrom and further connected to each two-way wireless communications device to effect two-way communication therethrough, wherein the controller is adapted to select one of the plurality of two-way wireless communication devices for external two-way wireless communications, the selection being made on the basis of an electronic signal received from at least one of the plurality of wake-up receivers; wherein the controller is adapted to wirelessly transmit data, received from the sensor device connected to the sensor input, via the selected two-way wireless communications device.

In a feature of this aspect, the wake-up receiver is adapted to transmit the electronic signal only upon receiving a wake-up signal that includes a class designation corresponding to the remote sensor interface. In another feature of this aspect, the two-way wireless communication device is a standards based radio. In still another feature of this aspect, the standards based radio is a Bluetooth radio.

In another feature of this aspect, each low power radio system further includes a directional antenna, the directional antennas being arranged in an array to provide disparate, overlapping coverage zones.

In yet another aspect of the invention, a remote sensor interface link comprises a plurality of low power radio systems, each including a two-way wireless communication device and a wake-up receiver; and a controller, connected to each wake-up receiver to receive signals therefrom and further connected to each two-way wireless communications device to effect two-way communication therethrough, wherein the controller is adapted to select one of the plurality of two-way wireless communication devices for external two-way wireless communications, the selection being made on the basis of an electronic signal received from at least one of the plurality of wake-up receivers; wherein the controller is adapted to wirelessly transmit sensor data, received from a remote sensor interface, via the selected two-way wireless communications device.

In a feature of this aspect, the wake-up receiver is adapted to transmit the electronic signal only upon receiving a wake-up signal that includes a class designation corresponding to the remote sensor interface.

In another feature of this aspect, the two-way wireless communication device is a standards based radio. In still another feature of this aspect, the standards based radio is a Bluetooth radio.

In yet another feature of this aspect, each low power radio system further includes a directional antenna, the directional antennas being arranged in an array to provide disparate, overlapping coverage zones.

In still another aspect of the invention, a wireless communication system comprises a first wireless communication component; a sensor device; and a second wireless communication component, adapted to receive sensor data from at least one sensor device, including (i) a plurality of low power radio systems, each having a two-way wireless communication device and a wake-up receiver, and (ii) a controller, connected to each wake-up receiver to receive signals therefrom and further connected to each two-way wireless communications device to effect two-way communication therethrough, wherein the controller is adapted to select one of the plurality of two-way wireless communication devices for two-way wireless communications with the first wireless communication component, the selection being made on the basis of an electronic signal received from at least one of the plurality of wake-up receivers, (iii) wherein the controller is adapted to wirelessly transmit sensor data, received from the sensor device, to the first wireless communication component via the selected two-way wireless communications device.

In a feature of this aspect, the wake-up receiver is adapted to transmit the electronic signal only upon receiving a wake-up signal that includes a class designation corresponding to the remote sensor interface. In another feature of this aspect, the first wireless communication component is a gateway controller. In yet another feature of this aspect, the second wireless communication component is a remote sensor interface, and the sensor device communicates directly with the remote sensor interface. In still another feature of this aspect, the second wireless communication component is a remote sensor interface link, the wireless communication system further comprising a third wireless communication component, wherein the sensor device communicates indirectly with the remote sensor interface link via the third wireless communication component. In still another feature of this aspect, the third wireless communication component is a remote sensor interface, and wherein the sensor device communicates directly with the remote sensor interface.

In another feature of this aspect, the first wireless communication component is a remote sensor interface link. In yet another feature of this aspect, the second wireless communication component is a remote sensor interface, and the sensor device communicates indirectly with the remote sensor interface link via the remote sensor interface.

In yet another feature of this aspect, the two-way wireless communication device is a standards based radio. In still another feature of this aspect, the standards based radio is a Bluetooth radio.

In still another feature of this aspect, each low power radio system further includes a directional antenna, the directional antennas being arranged in an array to provide disparate, overlapping coverage zones.

VI. BRIEF DESCRIPTION OF THE DRAWINGS

Further features, embodiments, and advantages of the present invention will become apparent from the following detailed description with reference to the drawings, wherein.

VI. DETAILED DESCRIPTION OF THE PREFERRED EMBODIMENTS

Figure 1:
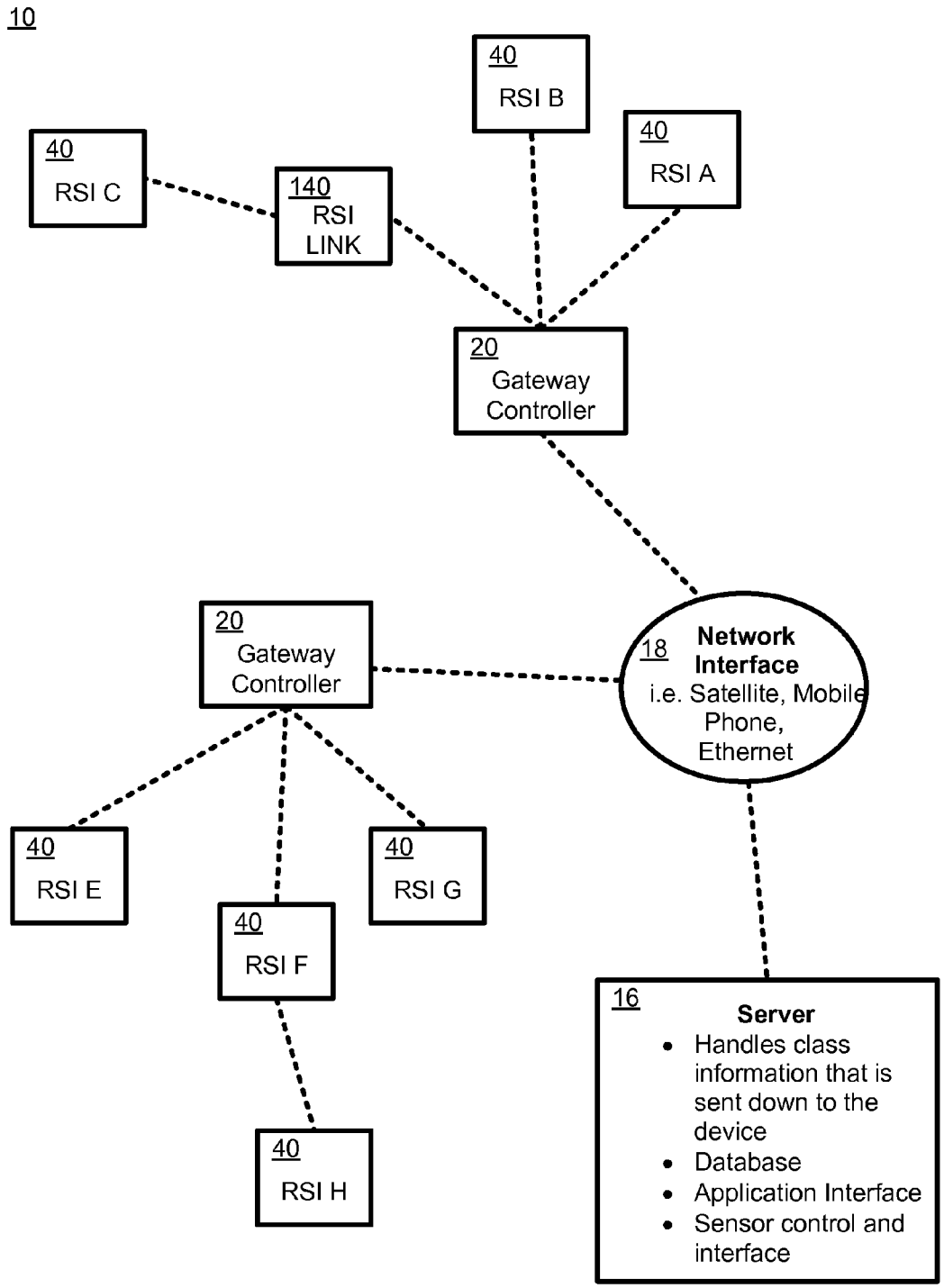
FIG. 1 is a block diagram of a system for using wake-up receivers for soft hand-off in wireless communications, according to a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a system 10 for using wake-up receivers for soft hand-off in wireless communications, according to a preferred embodiment of the present. The system 10 includes one or more gateway controllers 20 linked to a server 16 via a network interface 18 via wired or wireless communication, depending on the implementation of the system 10. Each gateway controller 20 may further communicate wirelessly with one or more remote sensor interface ("RSI") 40. As will be evident to the Ordinary Artisan, the gateway controller 20 may be any central radio unit, the design and implementation of which will likewise be apparent to the Ordinary Artisan, that is capable of initiating and carrying out wireless communication with RSIs 40. Indeed, it will likewise be evident that the specific communication devices and methods described and illustrated herein may be used for wireless communication between other types of radio devices. As illustrated in FIG. 1, one or more RSI 40, such as those designated "RSI C" and "RSI H," may be linked to a gateway controller 20 only via another RSI 40, such as the one designated "RSI F," or an RSI link 140. In this regard, RSI F and the RSI link 140 each provide hopping capability, thereby permitting gateway controllers 20 to communicate with RSIs 40 with which they are not in direct contact.

Figure 2:
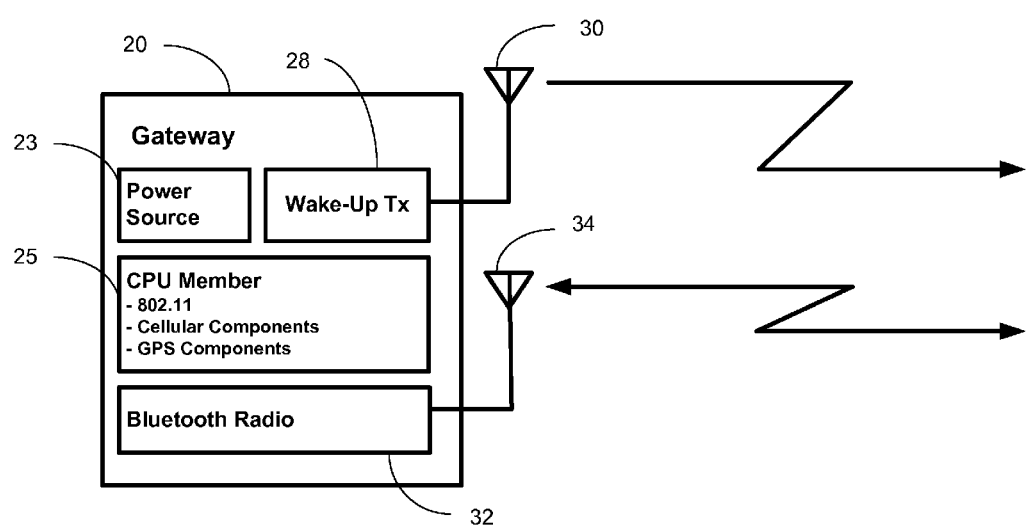
FIG. 2 is a block diagram of one of the gateway controllers of FIG. 1.

FIG. 2 is a block diagram of one of the gateway controllers 20 of FIG. 1. As shown therein, the gateway controller 20 includes a power source 13 such as a battery or connection to an external power source for powering systems of the gateway controller 20; a central processing unit (CPU) section 25 for controlling operations of the gateway controller 20; a wake-up transmitter 28 coupled to an external patch antenna 30, such as a 6.5 dBi omni-directional antenna, for transmitting wake-up signals; and a two-way wireless communication device 32 including an antenna 34 for two-way communications. The two-way wireless communication device 32 is preferably a standards based radio ("SBR") such as, for example, a Bluetooth radio, a WiFi radio, a Zigbee radio, an Ultra-Wideband (UWB) radio, or a WiMAX radio, with a Bluetooth radio being the most preferred. The CPU section 35 most predominantly includes a microprocessor and 802.11 or other communication capability, but optionally, may further include a global positioning system (GPS) and cellular telephony communications capabilities. The gateway controller 20 serves as a fixed-area or mobile interface between RSIs 40 and the network interface 18, which in turn may connect to other networks, such as the Internet, a cellular network, or a Satellite network.

Figure 3A:
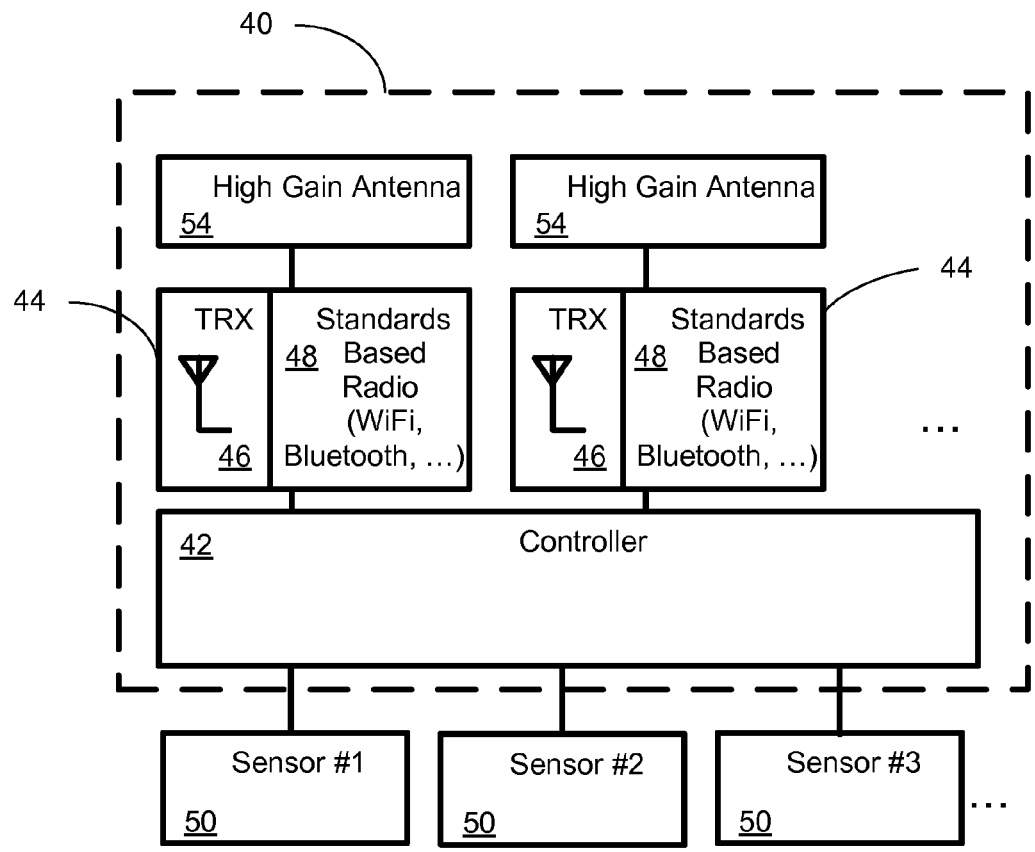
FIG. 3A is a block diagram of one of the remote sensor interfaces of FIG. 1.

FIG. 3A is a block diagram of one of the RSIs 40 of FIG. 1. As shown therein, the RSI 40 includes a controller 42 and a plurality of low power radio systems 44. Each low power radio system 44 includes a wake-up receiver 46, for receiving wake-up signals from the gateway controller 20 and/or other RSIs 40, and a two-way wireless communication device 48, including a high gain antenna 54, for two-way communications. Each two-way wireless communication device 48 is preferably an SBR such as, for example, a Bluetooth radio, a WiFi radio, a Zigbee radio, an Ultra-Wideband (UWB) radio, or a WiMAX radio, but which in any case is generally selected to match the two-way wireless communication radio 22 of the gateway controller 20. The wake-up receiver 46 further includes an ultra-low power consumption, wide band receiver and includes an antenna etched on a printed circuit board.

The RSI 40 may be associated with one or more sensors 50, or the RSI 40 itself may serve as a gateway to other RSIs 40. One particularly common application for RSIs 40 is in the tracking of various assets, wherein each of a plurality of RSIs 40 is associated with a particular asset and/or an RSI 40 is associated with an asset, such as a shipping container, pallet, or the like, that carries or contains other assets. The use of devices similar to RSIs 40 to track assets has been described in U.S. Patent Application Publication No. 2005/0093702 A1, in which such devices are often generally referred to as "wireless transceivers" or "WRTs." Insofar as the RSI 40 is associated with assets, such as shipping containers and/or contents thereof, the RSI 40 further preferably is capable of interfacing or interacting with asset monitoring sensors 50 that monitor conditions, phenomena, or the like inside or outside the container and/or inside or outside a particular asset in the container. Such sensors 50 may include, without limitation, electronic seals capable of detecting openings and/or closures of the container, cameras, microphones, RF signal detectors, light detectors, temperature sensors, radiation sensors, chemical sensors, and motion detectors. The particular use and implementation of RSIs in shipping containers has been further described in U.S. patent application Ser. No. 11/306,765. The RSI controller 42 preferably includes a sensor board (not shown) having circuitry for interfacing with such asset monitoring sensors 50.

Two-way wireless communications are used to convey commands and queries from the gateway controller 20 to the RSI 40 and to convey data, which may include sensor data acquired from the monitoring sensors 50, from the RSI 40 to the gateway controller 20.

Figure 3B:
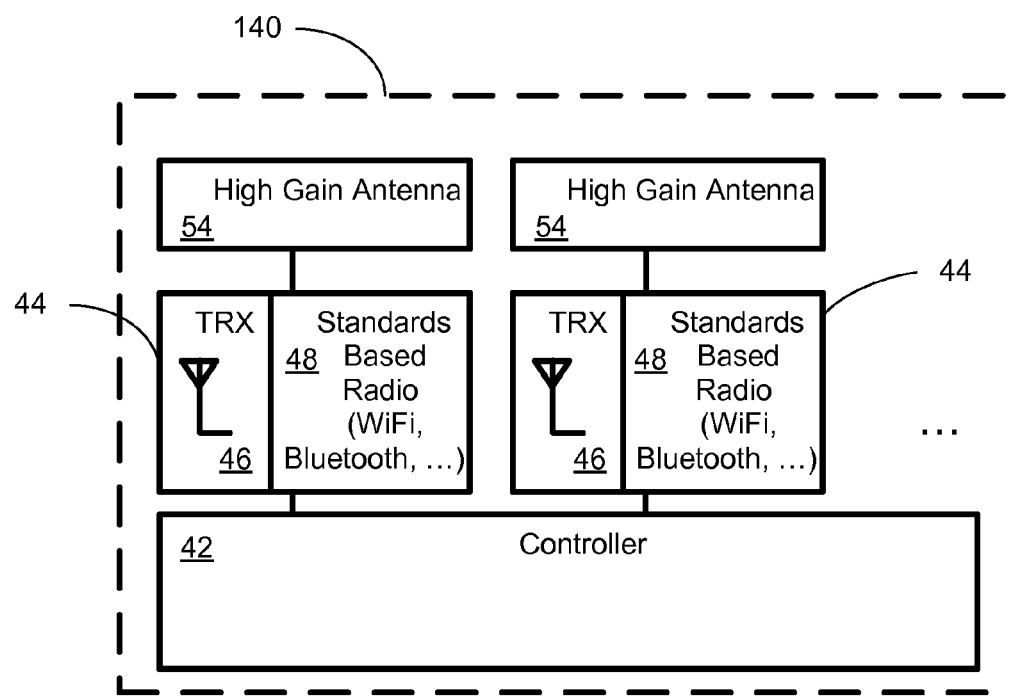
FIG. 3B is a block diagram of the RSI link device of FIG. 1.

FIG. 3B is a block diagram of the RSI link 140 of FIG. 1. For general purposes of the discussion that follows, RSI links 140 are understood to be similar in design and operation to RSIs 40 themselves. Of course, it will be apparent to the Ordinary Artisan that RSI links 140 may include additional functionality, but such differences are not particularly relevant to the discussion that follows.

Figure 4:
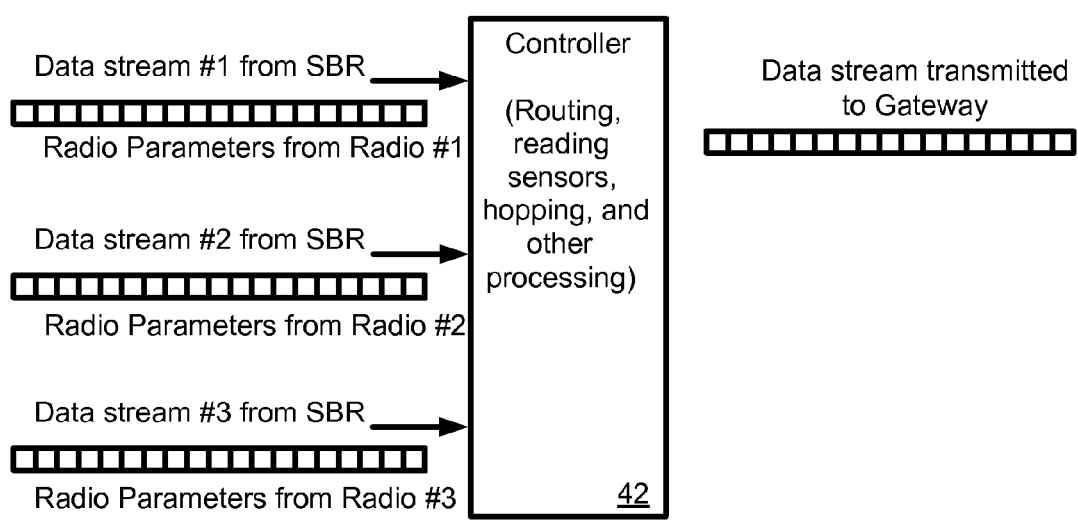
FIG. 4 is a schematic diagram illustrating the receipt and transmission, by the RSI controller, of data streams to and from a gateway controller according to the currently most reliable communication channel.

FIG. 4 is a schematic diagram illustrating the receipt and transmission, xxx by the RSI controller 42, of data streams to and from a gateway controller 20 according to the currently most reliable communication channel. As one or more of the low power radio systems 44 receives wireless communication signals from the gateway controller 20, the RSI controller 42 monitors signal strengths, Bit Error Rates (BER's), and other parameters available during reception and determines which of the multiple on-board SBR devices 48 currently represents the most reliable communication channel. The controller 42 then routes wireless communications through the SBR device 48 that represents the most reliable channel. After an initial channel is selected, the RSI controller 42 then continuously or intermittently monitors the parameters of the multiple on-board SBR devices 48 for updating the determination and selection of the optimal SBR device 48. As changes in conditions occur, the RSI controller 42 looks for other wakeup signals as potential alternatives to the current SBR communication channel. If a valid wakeup is seen, the RSI controller will monitor the channel and may determine that a second on-board SBR device 48 has become the most reliable channel. In this case the RSI controller 42 triggers a "soft" handoff wherein wireless communications of the RSI 40 are handed off to the second on-board SBR device 48. When two or more on-board SBR devices 48 represent equivalently reliable channels, the controller 42 routes communications through an arbitrarily selected one of the two or more devices 48 until a further change in conditions occurs.

Based on the protocols available with the SBR, the RSI controller will determine the best times for the SBRs to transmit. Transmission must be tightly controlled due to close proximity of the SBR antennas and issues with saturating the receiver front ends Also this prevents the respective transmitters/transceivers of the various SBR devices 48 from conflicting with each other and also reduces power consumption for the RSI 40 as a whole.

In each low power radio system 44, the wake-up receiver (also called the TRX or Tag Turn-On Receiver) 46 minimizes power consumption by controlling whether the corresponding SBR device 48 is active, and the level of that activation. The wake-up receiver or TRX 46 tightly controls power so that standby current is driven down to micro-amps. The TRX signal is used to select the first radio that will engage in communications. The other radios are booted up and begin listening to the RF signal. The other low power radios 44 are preferably not utilized in transmitting signals to the gateway controller unless the first radio system 44 begins to lose the signal and the other radio systems 44 have better reception.

One or more of the wake-up receivers 46 of a particular RSI 40 may be activated, thereby waking up the corresponding SBR devices 48, by specifically directing a wake-up signal toward the particular RSI 40 using some sort of data identifier. In particular, a wake-up signal may be specifically directed toward a particular RSI 40 by including a unique identifier of the RSI 40 in the wake-up signal. Preferably, however, the wake-up receiver 46 may operate at least partly on the basis of class designations. In this regard, each RSI 40 (or each "Wireless Tag," as that term is used in U.S. Patent Application Publication No. 2005/0093702 A1) includes a "class designation" representative of an attribute, characteristic, relation, or behavior of the RSI 40 or associated asset or assets, and each RSI 40 or Wireless Tag is said to belong to, or be a member of, a particular Class based on its class designation. Identification of the Class for which a particular RSI 40 or Wireless Tag is designated preferably is stored on the RSI 40 or Wireless Tag and is utilized by the RSI 40 or Wireless Tag in screening broadcasts for determining whether to respond thereto with a transmission. The Class may represent any type of identification, as desired. Further information about class designations and their uses may be found in the aforementioned U.S. Patent Application Publication No. 2005/0093702 A1.

When a broadcast or multicast is made to the RSIs 40 or Wireless Tags, each RSI 40 or Wireless Tag is capable of identifying a specified Class in the broadcast and replying to the broadcast with its own transmission when the specified Class matches its Class. If the Class does not match its class designation, then the RSI 40 or Wireless Tag does not respond to the broadcast and it makes no transmission. In this regard, each RSI 40 or Wireless Tag is a transponder that may be selectively activated. Semi-passive transceivers that are capable of being used to respond to targeted broadcasts in accordance with the present invention, and not to every broadcast received, are well known within the art and, accordingly, the specific design of such semi-passive transceivers forms no part of the present invention.

The class designations are used by each wake-up receiver 46 to screen each broadcast or multicast intended for receipt by a particular class. A command, query, or the like (sometimes generically referred to as a message) is communicated in a transmission to members of a particular class in an RSI broadcast as part of a data packet that begins with a preamble including an identification of the Class intended as the target of the broadcast. Other information may also be included in the data packet for screening purposes by one or more of the wake-up receivers 46 in each RSI 40. Wake-up receivers 46 within range of the broadcast awake from a standby mode to receive the data packet, but only process the message therein with possible transmissions in response thereto when the Class of the preamble matches the Class of the RSI 40 (and when the other screening information, if present, also is matched). If there is no match, then the particular RSI 40 does not process the message, drops the data packet, and returns to standby mode.

Thus, rather than direct a wake-up signal toward a particular RSI 40 using a unique identifier of the RSI 40, a wake-up signal may alternatively be specifically directed toward a particular class of RSIs 40 as identified by a class designation. In this regard, the wake-up signal would include the class to which the wake-up signal is directed. In yet another alternative, a wake-up signal may be directed to all RSIs 40. In this regard, the wake-up signal would include an indication to this effect. Preferably in class-based systems, such a wake-up signal would include a class designation that includes, as members of the class, all of the RSIs 40 (i.e., an all encompassing or root class).

In general, wireless communication between the gateway controller 20 and the RSI 40 may thus be carried out as follows. The gateway controller 20 first transmits, via the wake-up transmitter 28, a wake-up signal to the RSI 40. At the RSI 40, the wake-up signal is received by a wake-up receiver 46 of the RSI 40. Upon wake-up of the RSI 40, the gateway controller 20 and RSI 40 engage in the two-way communications 16 using the SBR device 48 corresponding to the first wake-up receiver 46 and the standards based radio 32 of the gateway controller 20.

If a gateway controller 20 is unable to communicate directly with a particular RSI 40, it may still be able to communicate with such an RSI 40, using conventional hopping techniques, via an RSI link 140 or another RSI 40. Such communication paths are schematically represented in FIG. 1 between a first gateway controller 20 and the RSI 40 designated "RSI C" via the RSI link 140 and between a second gateway controller 20 and the RSI 40 designated "RSI H" via the RSI 40 designated "RSI F." The remote RSIs 40 ("RSI C" and "RSI H") may still be awakened in the same manner as the other RSIs 40 (i.e., using class designations).

Although considerable reduction in power consumption may be achieved using a class-based wake-up signal process as described above, still further reduction in power consumption may be achieved using a stepped wake-up sequence such as one described in U.S. patent application Ser. No. 11/422, 321. For example, as set forth therein, the low power radio system 44 may generally reside in a low or no power consumption state, wherein the RSI 12 draws electrical current that is only on the order of magnitude of tens of microamps. When the wake-up receiver 46 determines that a wake-up signal is likely present, for example, by way of a measured signal strength that prevails over any present RF noise, the low power radio system 44, and specifically, the wake-up receiver 46 enters a second state in which the low power radio system 44 overall draws on the order of hundreds of microamps of electrical current.

In this second state, the wake-up receiver 46 evaluates the signal for one or more particular criteria, such as the presence of a particular modulation in the possible wake-up signal. For example, the signal may be analyzed with regard to amplitude, frequency and/or phase to determine if the signal is modulated according to the applicable standard, such as GFSK or FSK, that is being utilized in the operation of the wake-up receiver 46. If the signal is not modulated according to the applicable standard (a situation where digital information is not going to be extracted from the signal), then the signal is deemed not to be a wake-up signal and the low power radio system 44 returns to the first state, i.e., the standby state. On the other hand, if the signal is modulated according to the applicable standard, then the low power radio system 44, and specifically the wake-up receiver 26, enters a third state in which the low power radio system 44 overall draws on the order of magnitude of a milliamp of electrical current.

In this third state, the wake-up receiver 46 receives a modulated signal and extracts and interprets digital information therefrom. In this regard, the wake-up receiver 46 extracts digital information such as class and/or other data from the modulated signal. For example, the digital information embedded in the wake-up signal transmitted by the gateway controller 20 may include a class that is determinative of whether the low power radio system 44 enters a fourth state or returns to the first, or standby, state, wherein if the class of the wake-up signal matches a class of the RSI 40, then a fourth state is preferably entered, and if the class of the wake-up signal does not match a class of the RSI 40, then the first, or standby, state is preferably re-entered.

In the fourth state, the low power radio system 44 overall draws on the order of tens to hundreds of milliamps of electrical current. In this state, the wake-up receiver 46 "wakes up" the corresponding SBR device 48 of the RSI 40 whereby the RSI 40 begins to actively receive data in communications from a gateway 20 or another RSI 40. Such communications received by the RSI 40 may configure the RSI 40 with regard to sensors 50 with which the RSI 40 is associated. Alternatively, the commands received may configure the RSI 40 with regard to a periodic wake-up schedule for periodic exchanges of communications with the gateway controller 20. The communications received further may alter a class designation of the RSI 40, may prompt the RSI 40 to communicate with other RSIs 40, may relate to network formations among multiple RSIs 40, or the like.

A fifth state is entered when the SBR device 48 corresponding to the wake-up receiver 46 actively transmits data. In this fifth state, the low power radio system 44 overall draws on the order of magnitude of hundreds to thousands of milliamps of electrical current. In particular, the SBR device 48 of the RSI 40 actively transmits wireless communications to the gateway controller 20 or to one or more other RSIs 40. Thus, though the two-way wireless communication device 48 of the RSI 40 is active in both the fourth state and the fifth state, the two states being distinguished because actively transmitting signals generally draws substantially more electrical current than actively receiving signals.

The multiple SBR devices 48 are utilized in the RSI 40 to optimize detection and reception by the RSI 40 of radio signals from gateway controllers 20, hopping radios, and other wireless devices. The wake-up technology described herein may be used in a variety of ways to reduce power consumption in the multi-SBR environment while helping to ensure reliable two-way communications whenever possible. For example, the RSI controller 42 may be arranged to awaken each SBR device 48 whenever any of the corresponding wake-up receivers 46 determine that a signal intended for the RSI 40 has been received. Alternatively, each SBR device 48 may be controlled according to its own wake-up receiver 46, wherein each respective SBR device 48 remains in standby mode until its corresponding wake-up receiver 46 causes it to awaken. Still further alternatively, the entire wake-up sequence may be used when all SBR devices 48 are in standby mode and a wake-up signal is first received, but a portion of the wake-up sequence may be used when one SBR device 48 is already communicating with a gateway controller 20. Other variations will be apparent to the Ordinary Artisan.

Figure 5A:
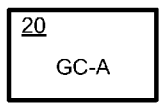
FIGS. 5A-5G are schematic diagrams illustrating the operation of an RSI in accordance with a first implementation of the present invention.
Figure 5A:
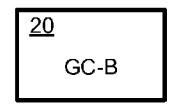
Figure 5A:
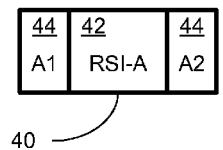
Figure 5B:
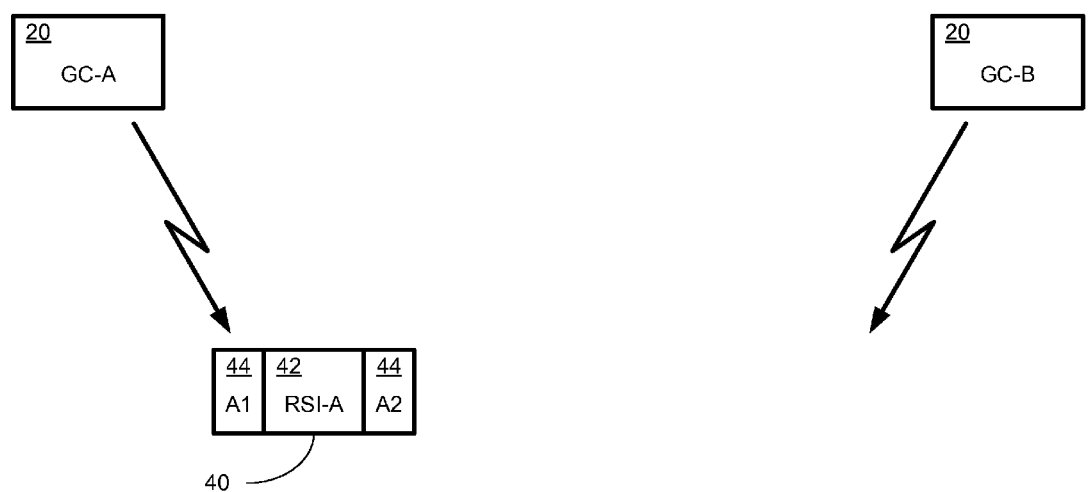
Figure 5C:
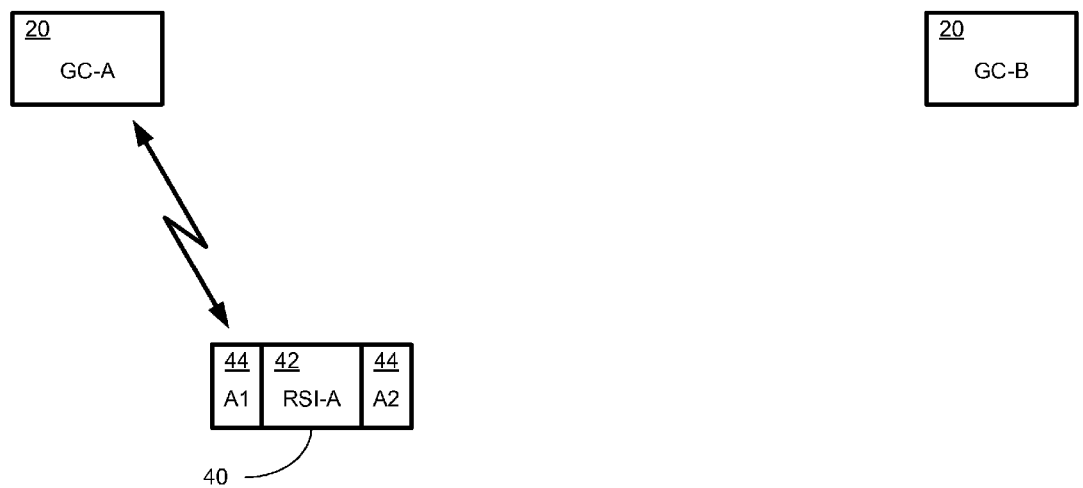
Figure 5D:
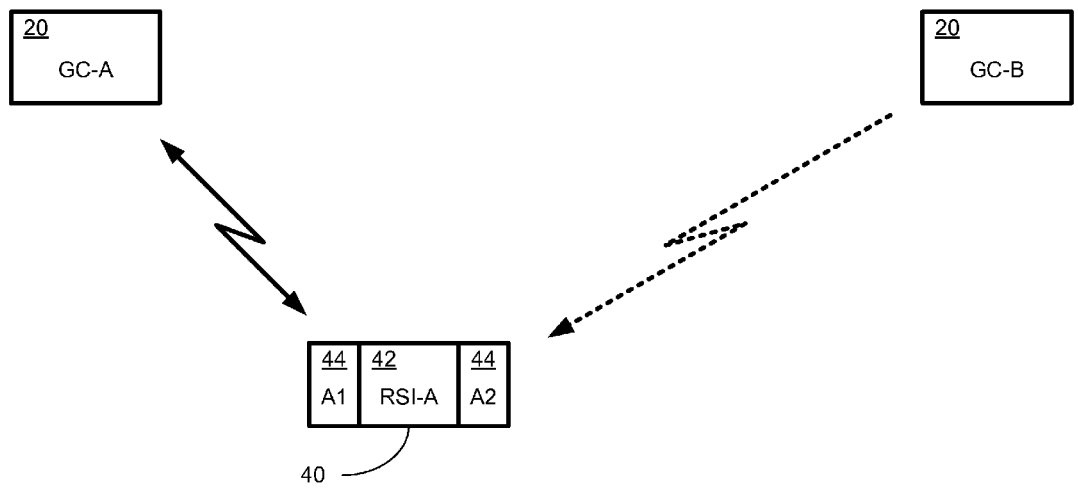
Figure 5E:
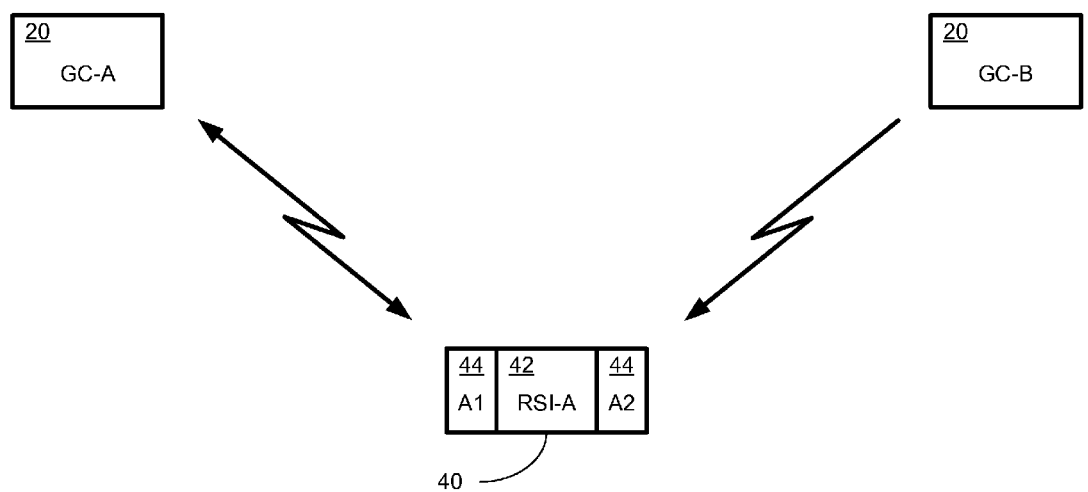
Figure 5F:
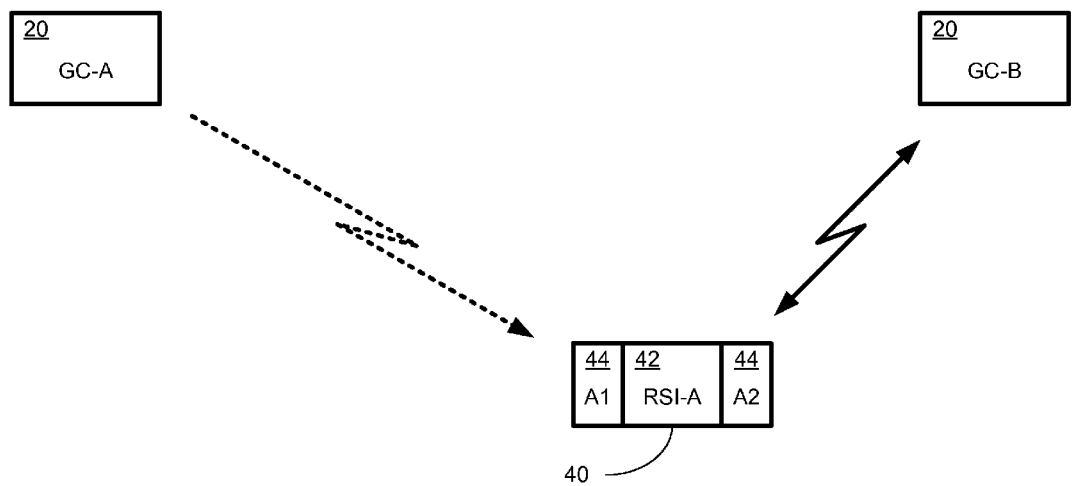
Figure 5G:
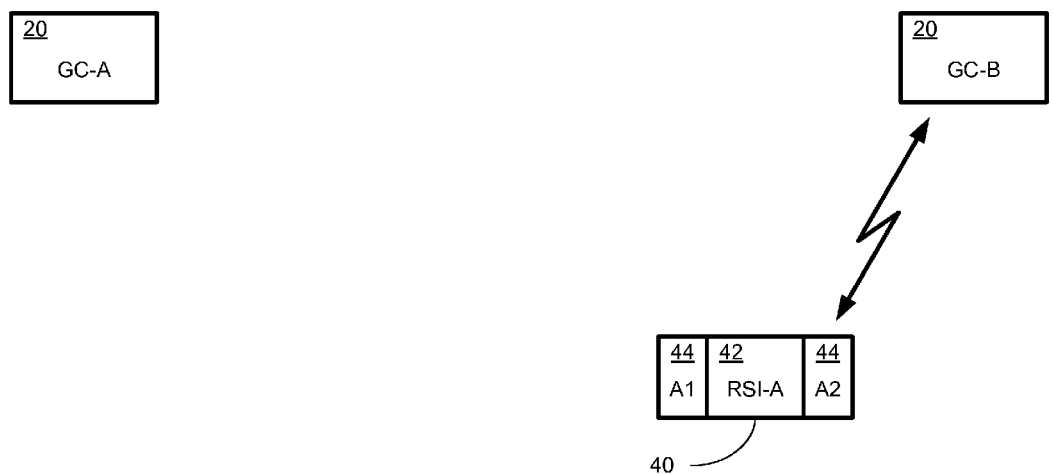

FIGS. 5A-5G are schematic diagrams illustrating the operation of an RSI 40 in accordance with a first implementation of the present invention. FIG. 5A shows a single RSI 40, designated "RSI-A" and having two low power radio systems 44 designated "A1" and "A2," that may communicate with one or both of two gateway controllers 20, designated "GC-A" and "GC-B," but with which neither gateway controller 20 has yet established communication. In FIG. 5B, the gateway controllers 20 have transmitted wake-up signals to a class of RSIs 40 that includes RSI-A 40, but RSI-A 40 has only received (via low power radio system A1 44) the wake-up signal from GC-A 20 and in FIG. 5C, two-way communications have been established between RSI-A 40 (still via low power radio system A1 44) and GC-A 20. In FIG. 5D, RSI-A 40 has begun to move relative to the gateway controllers 20, and RSI-A's second low power radio system A2 44 has now received a wake-up signal from GC-B 20. By the time RSI-A 40 has reached the point shown in FIG. 5E, communication has been established with (i.e., transmissions are being received from) both GC-A 20 and GC-B 20. However, with RSI-A 40 still approximately equidistant from GC-A 20 and GC-B 20, communication with GC-A 20 is still as reliable as communication with GC-B 20 and thus there is no need to hand-off communications from low power radio system A1 44 (with GC-A 20) to low power radio system A2 44 (with GC-B 20). On the other hand, as RSI-A 40 reaches the point shown in FIG. 5F, communication with GC-A 20 has become less reliable than communication with GC-B 20, and thus the controller 42 of RSI-A 40 has triggered a soft handoff from low power radio system A1 44 to low power radio system A2 44. Because low power radio system A1 44 continues to receive a signal from GC-A 20, it remains active, receiving signals from GC-A 20, which are monitored by the RSI controller 42, but the low power radio system A2 44 does not transmit. Finally, by the time RSI-A 40 reaches the point shown in FIG. 5G, low power radio system A1 44 is no longer receiving any communications from GC-A 20.

Figure 6A:
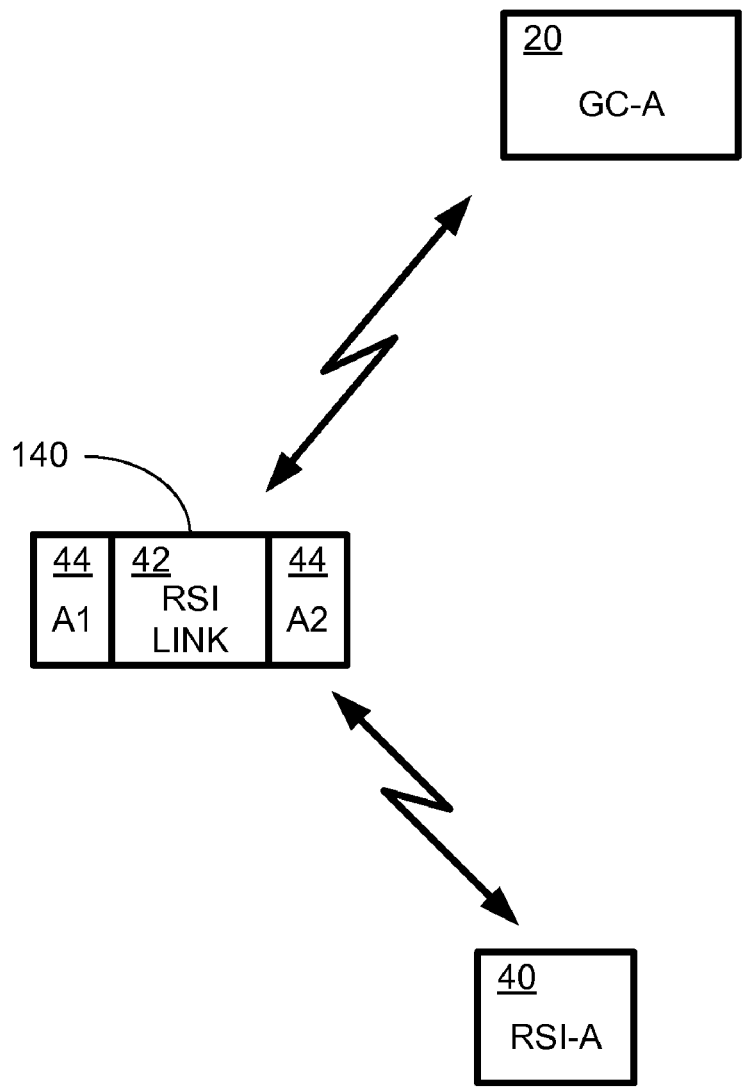
FIGS. 6A-6E are schematic diagrams illustrating the operation of an RSI in accordance with a second implementation of the present invention.
Figure 6B:
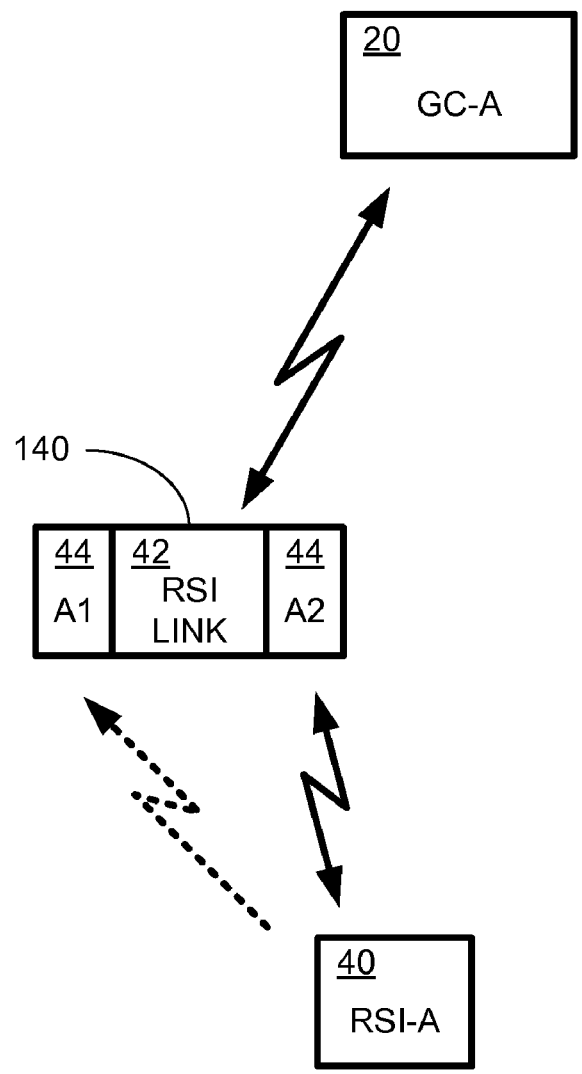
Figure 6C:
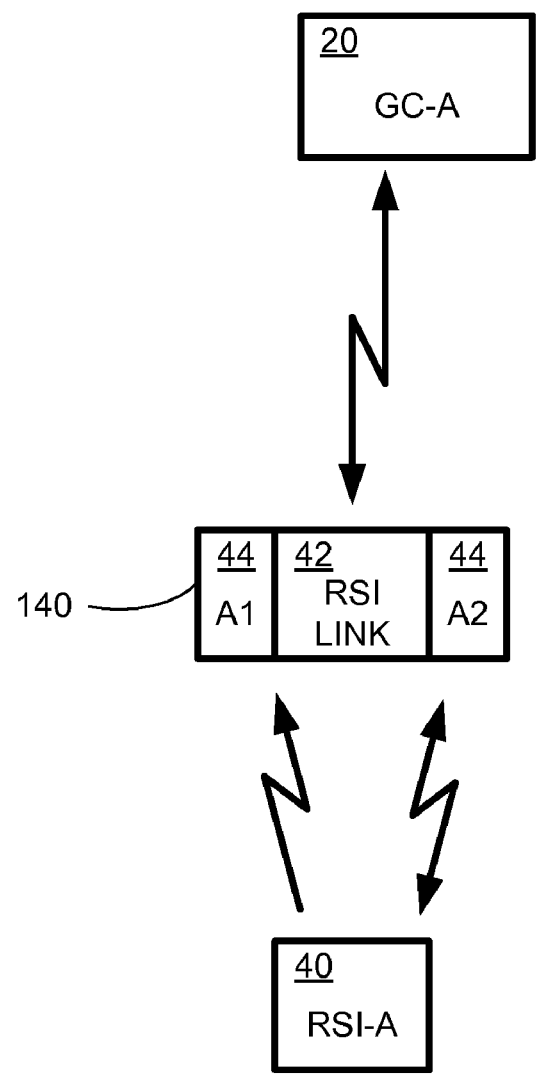
Figure 6D:
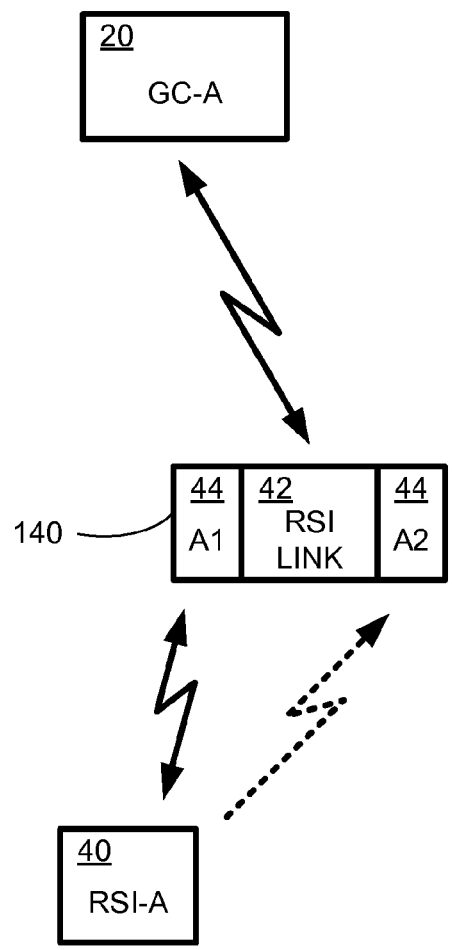
Figure 6E:
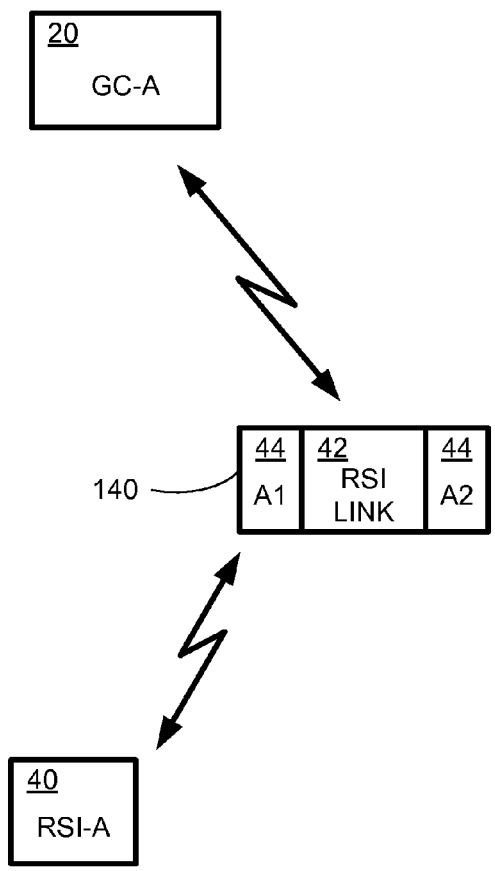

FIGS. 6A-6E are schematic diagrams illustrating the operation of an RSI 40 in accordance with a second implementation of the present invention. In this implementation, an RSI link 140 is in constant communication with a gateway controller, designated "GC-A," as it moves around searching for RSIs 40. In FIG. 6A, low power radio system A2 44 is in communication with an RSI 40 designated "RSI-A." In FIG. 6B, low power radio system A1 44 has begun receiving communications from RSI-A, but because the communication channel previously established by low power radio system A2 44 is still as good, no handoff has occurred. In FIG. 6C, the communication channel established by low power radio system A1 44 is as good as that maintained by low power radio system A2 44, but there is still no need to trigger a handoff. Finally, as the RSI link 140 moves farther past RSI-A 40, the communication channel established by low power radio system A1 44 is more reliable, and a soft handoff occurs to low power radio system A1 44, and by the time the RSI link 140 reaches the point shown in FIG. 6E, the original low power radio system A2 44 is no longer receiving communications at all.

Figure 7A:
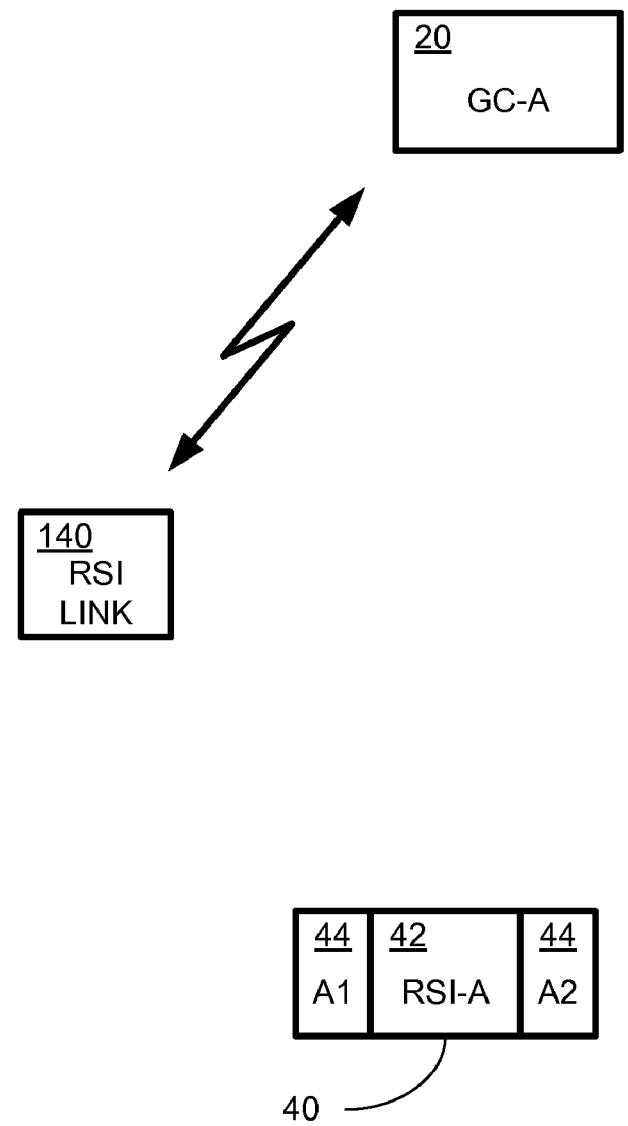
FIGS. 7A-7G are schematic diagrams illustrating the operation of an RSI in accordance with a third implementation of the present invention.
Figure 7B:
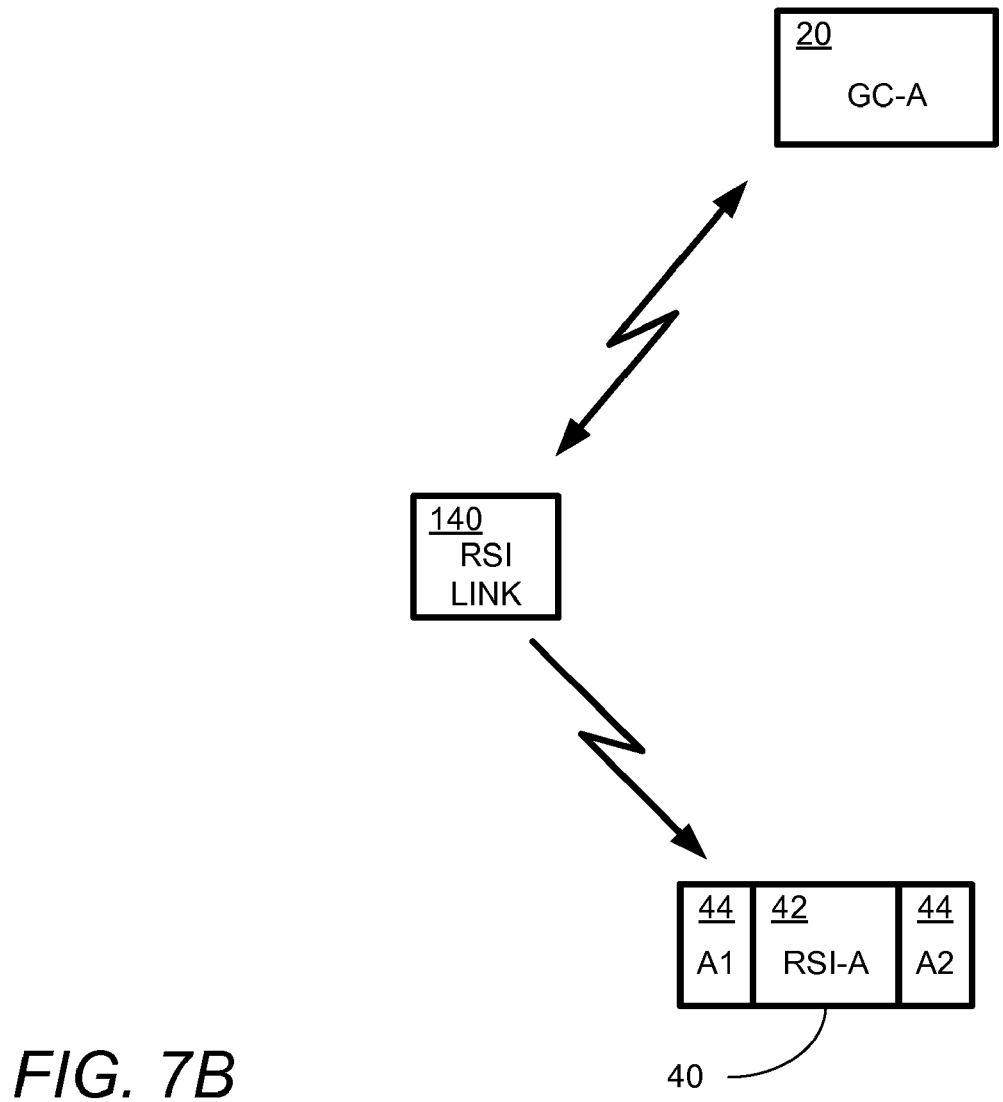
Figure 7C:
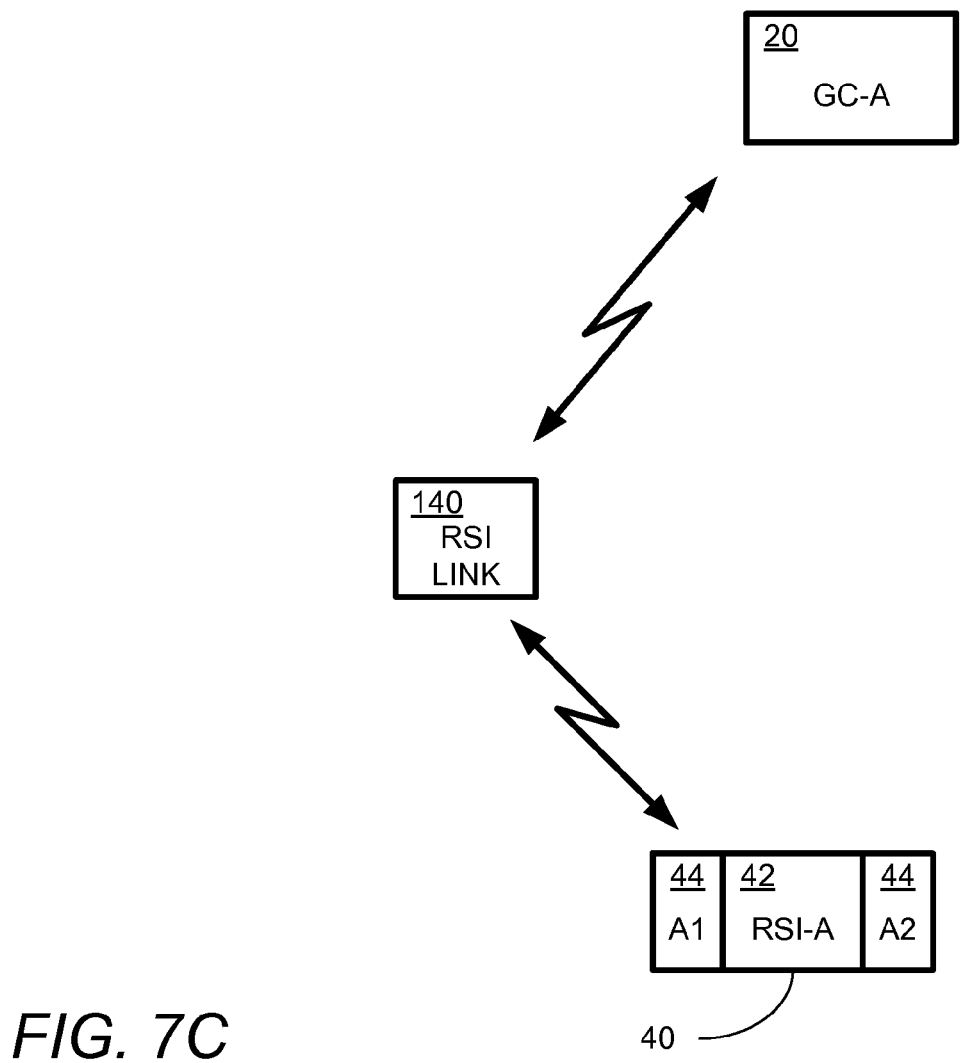
Figure 7D:
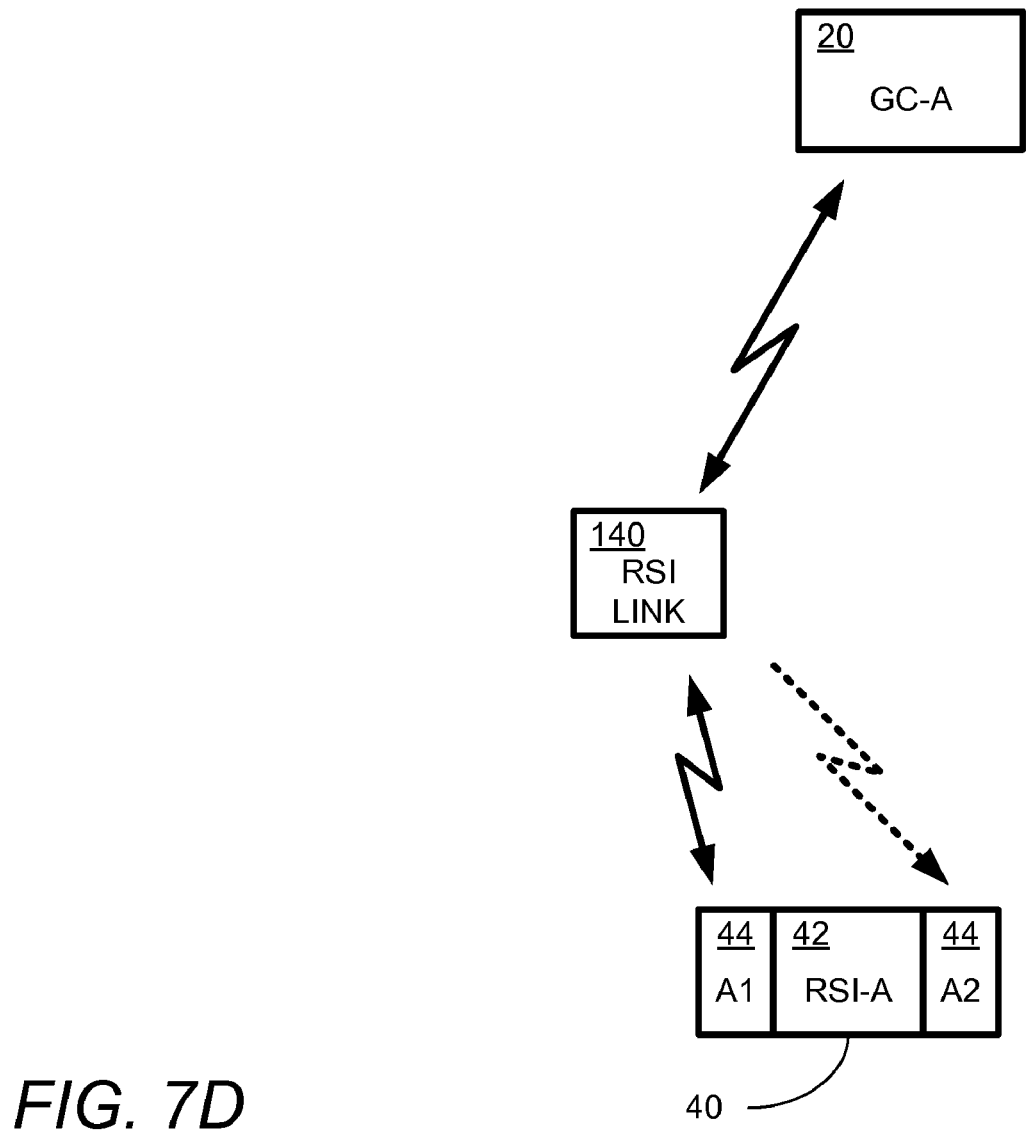
Figure 7E:
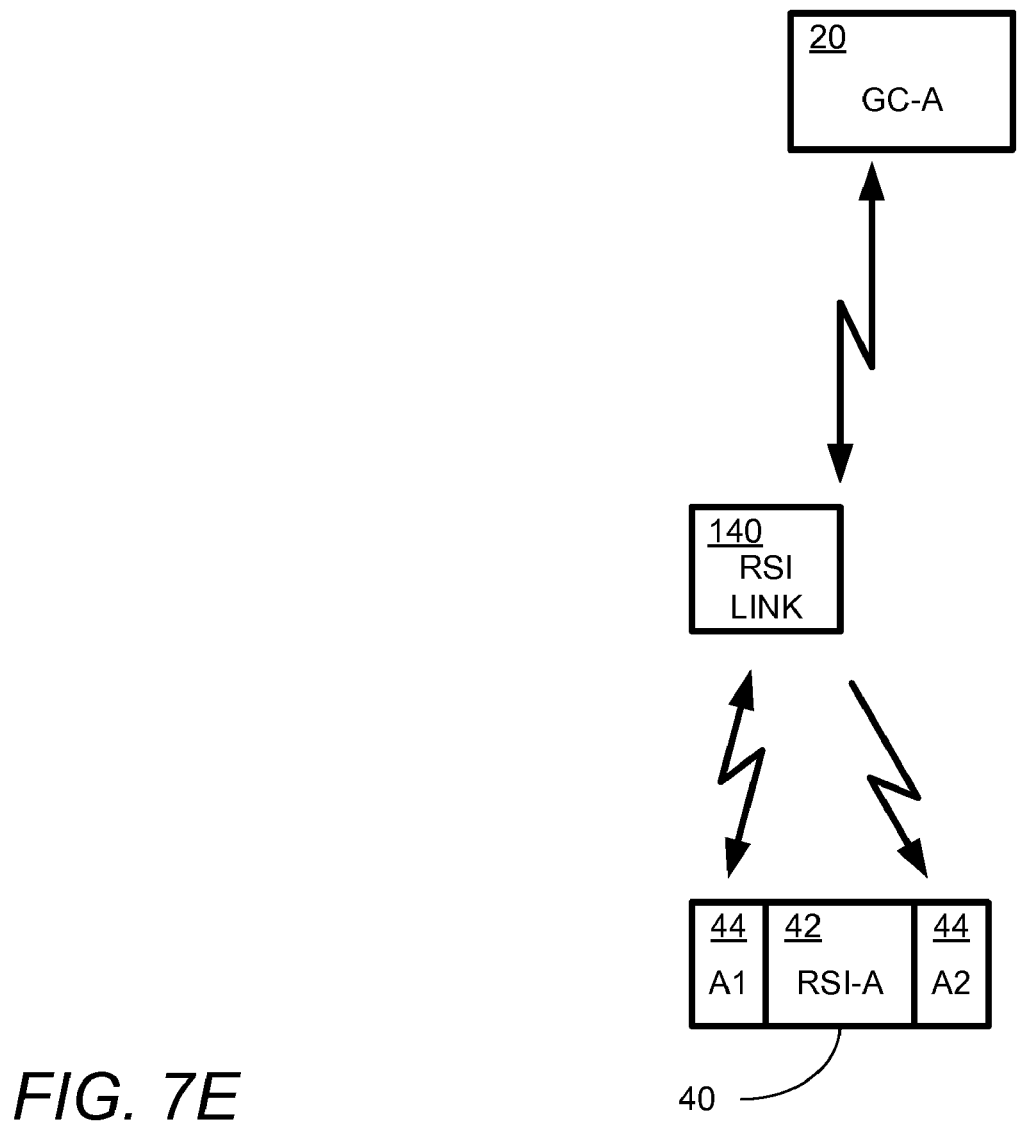
Figure 7F:
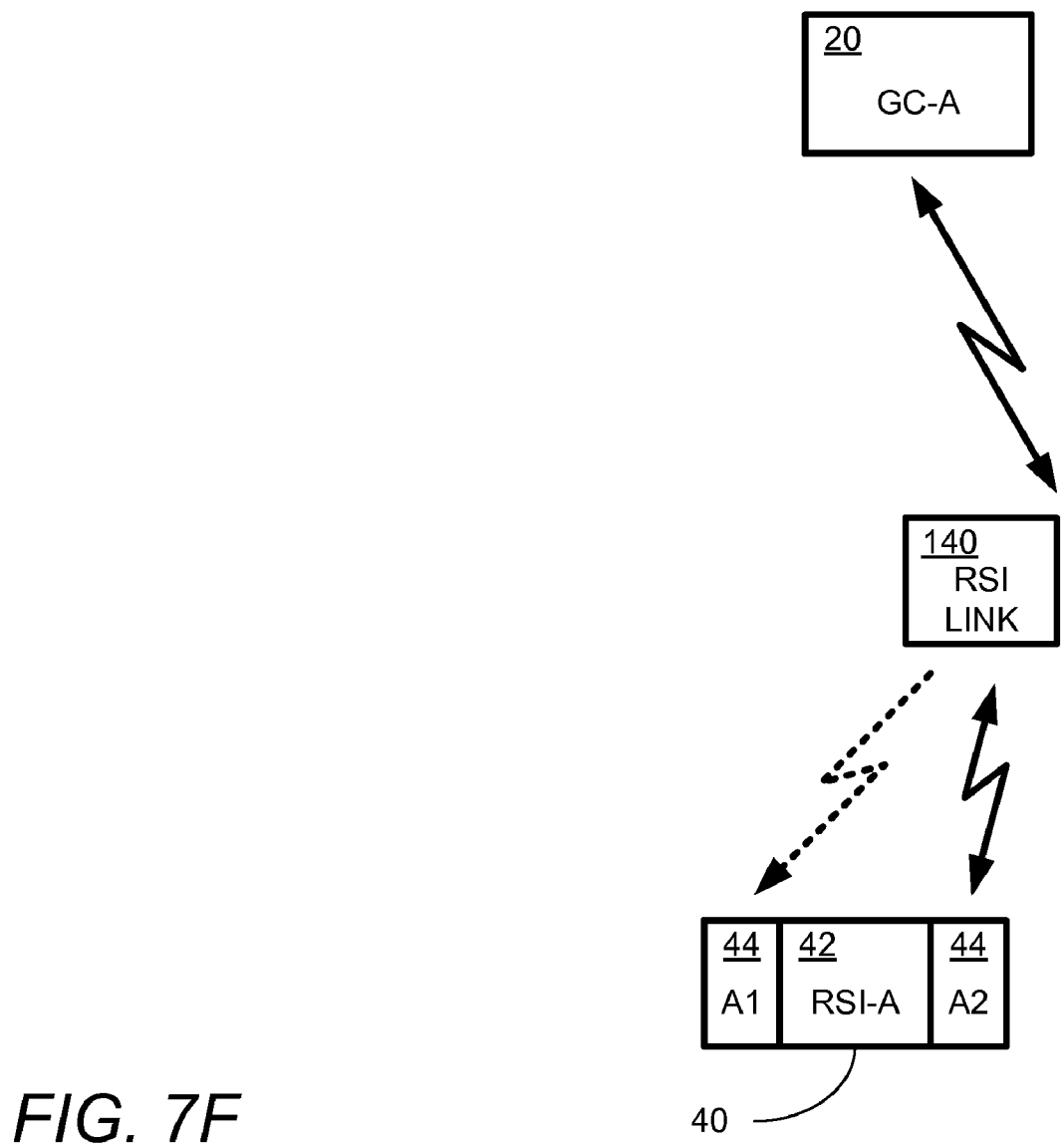
Figure 7G:
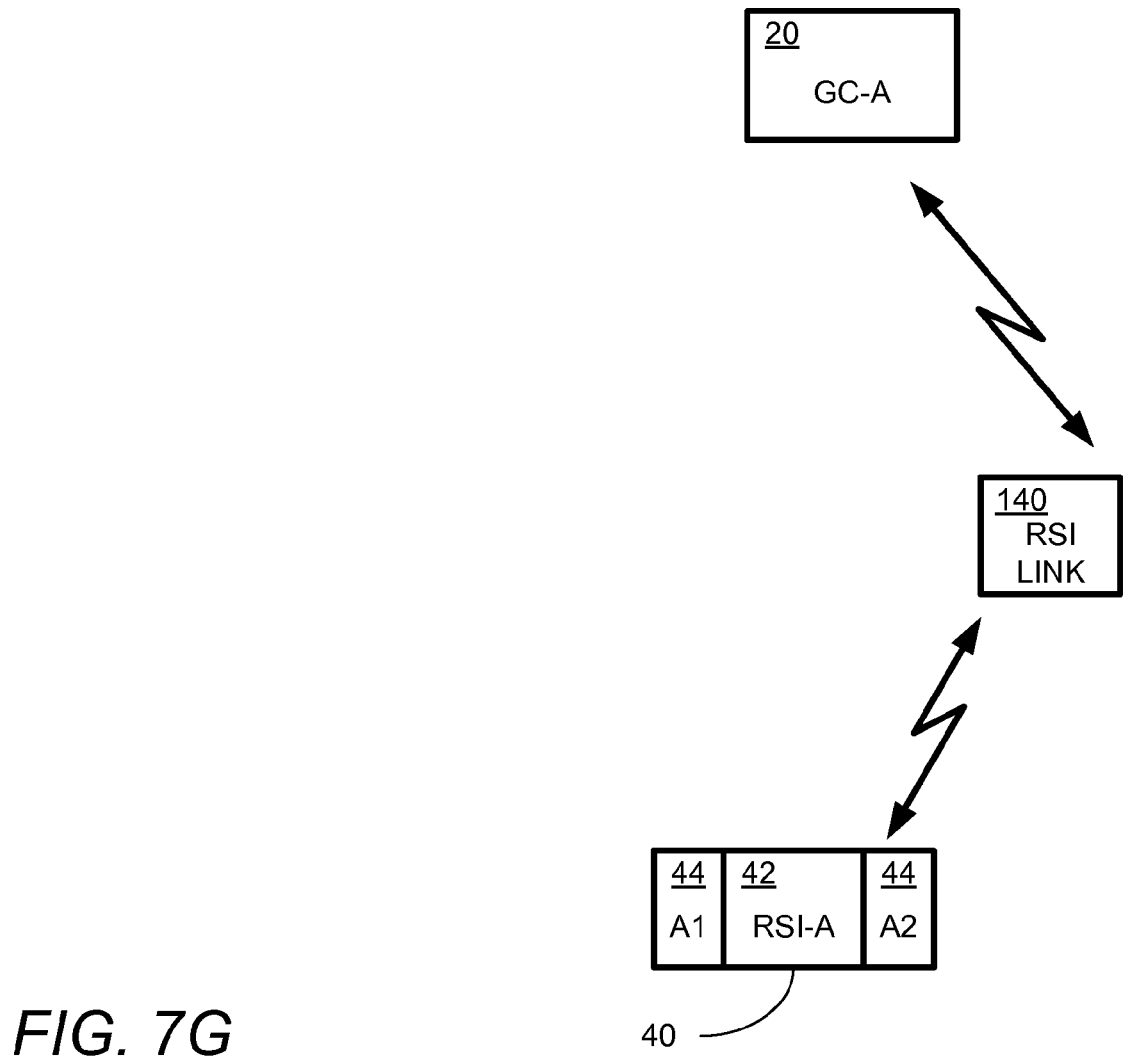

FIGS. 7A-7G are schematic diagrams illustrating the operation of an RSI 40 in accordance with a third implementation of the present invention. FIG. 7A shows a single RSI link 140 that may communicate with an RSI 40, designated "RSI-A," using one or both of two low power radio systems 44 designated "A1" and "A2," but with neither of which has the RSI link 140 yet established communication. In FIG. 7B, the RSI link 140 has transmitted a wake-up signal to a class of RSIs 40 that includes RSI-A 40, but only low power radio system A1 44 of RSI-A 40 has received the wake-up signal and in FIG. 7C, two-way communications have been established between RSI-A 40, via low power radio system A1 44, and the RSI link 140. In FIG. 7D, the RSI link 140 has begun to move relative to RSI-A 40, and RSI-A's second low power radio system A2 44 has now received a wake-up signal from the RSI link 140. By the time the RSI link 140 has reached the point shown in FIG. 7E, communication has been established with (i.e., transmissions are being received by) both low power radio system A1 44 and low power radio system A2 44. However, with the RSI link 140 still approximately equidistant from low power radio system A1 44 and low power radio system A2 44, communication with low power radio system A1 44 is still as reliable as communication with low power radio system A2 44 and thus there is no need to hand-off communications from low power radio system A1 44 to low power radio system A2 44. On the other hand, as the RSI link 140 reaches the point shown in FIG. 7F, communication with low power radio system A1 44 has become less reliable than communication with low power radio system A2 44, and thus the controller 42 of the RSI link 140 has triggered a soft handoff from low power radio system A1 44 to low power radio system A2 44. Because low power radio system A1 44 continues to receive a signal from the RSI link 140, it remains active, receiving signals from the RSI link 140, which are monitored by the RSI controller 42, but the low power radio system A1 44 does not transmit. Finally, by the time the RSI link 140 reaches the point shown in FIG. 7G, low power radio system A1 44 is no longer receiving any communications from the RSI link 140.

Antennas 54 can be oriented in directions that will best enable reception. For example, an antenna 54 oriented vertically upwards may optimally detect reflected signals and those from aircraft. Antennas 54 oriented vertically upwards and downwards may optimize receptions of signals in a building having multiple floors.

Multiple low power radio systems 44 may be used with directional antennas 54 that create a uniform coverage pattern around a circle, in a semi-circular arrangement, or in whatever arrangement is appropriate for a particular application. Moreover, the directional antennas 54 for the on-board SBR devices 48 preferably have overlapping RF patterns so that smooth hopping transitions among the devices is possible without signal dropping. The overlapping of the RF patterns of the antennas 54 avoids directional dead zones in the overall communications capability of the RSI 40 and minimizes signal dropping. For example, three SBR devices 48 having respective antennas 54 each with 180 degree RF patterns can be oriented such that the centers of the patterns are mutually separated by 120 degrees. Thus, each antenna RF pattern overlaps with a neighboring RF pattern by 60 degrees at each extreme of its 180 degree breadth.

Other configurations could be used driving the gain choices. A trade-off will occur between the number of radios and the high gain that will improve the range of the radio. A minimum of two radios are needed in the constellation to perform the soft handoff.

In another implementation, the TTO (Tag Turn-On) signal can be periodically sent to simplify switching between standards based radios that do not support simple listening modes. The RF transmission can also be controlled with RF switches in order to reduce the complexity required by the software in the controller.

In yet another implementation of the present invention (not illustrated), a gateway controller 20 may be equipped with the hand off technology described and illustrated herein, wherein the gateway controller 20 includes a controller 42, a wake-up receiver (which may be a wake-up receiver 46 as described hereinabove) for receiving wake-up signals from another gateway controller 20 and/or other wireless base station devices, and a plurality of two-way wireless communication devices 48, each including a high gain directional antenna 54, for two-way communications. Each two-way wireless communication device 48 is preferably an SBR such as, for example, a Bluetooth radio, a WiFi radio, a Zigbee radio, an Ultra-Wideband (UWB) radio, or a WiMAX radio, but which in any case is generally selected to match the two-way wireless communication devices 48 used in RSIs 40. Such a gateway controller 20 may be particularly well adapted for communicating with nearby RSIs 40 or RSI links 140 that are moving while the gateway controller remains stationary. More particularly, as the respective RSI 40 or RSI link 140 moves past or around the gateway controller 20, the controller 42 controls the SBR devices 48 such that all SBR devices 48 receiving a signal from the RSI 40 or RSI link 140 are activated to listen to such signal, but the controller 42 chooses when the SBR device 48 transmits to the RSI 40 or RSI link 140. Soft handoff technology may be utilized to switch transmission capability from one SBR device 48 to another based on which SBR device 48 is likely to have the most reliable communication channel.

There are many benefits provided by one or more embodiments of the invention. Improved sensitivity and diversity provide robust communications. Gain makes communications more directional, thereby improving reception and minimizing the potential for interception. The wake-up receiver 46 minimizes power consumption. Since standards based radios are point to point, two-way communications can be accomplished.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A method of facilitating a soft hand-off in wireless communications, comprising:
   (a) providing a first wireless component and a second wireless component, the second wireless component including a controller and first and second low power radio systems;
   (b) receiving, at a wake-up receiver of the first low power radio system in the second wireless component, a first wake-up signal;
   (c) in response to receiving the first wake-up signal, sending a first electronic signal to the controller;
   (d) in response to receiving the first electronic signal at the controller, activating a two-way wireless communication device of the first low power radio system, thereby facilitating two-way wireless communication with the first wireless component;
   (e) receiving, at a wake-up receiver of the second low power radio system in the second wireless component, a second wake-up signal;
   (f) in response to receiving the second wake-up signal, sending a second electronic signal to the controller; and
   (g) in response to receiving the second electronic signal at the controller, activating a two-way wireless communication device of the second low power radio system and deactivating the two-way wireless communication device of the first low power radio system, thereby facilitating two-way wireless communication with the first wireless component.

2. The method of claim 1, wherein the step of sending the first electronic signal to the controller is conditioned on the first wake-up signal including a class designation corresponding to the second wireless component.

3. The method of claim 2, wherein each two-way wireless communication device is a standards based radio.

4. The method of claim 3, wherein each standards based radio is a Bluetooth radio.

5. The method of claim 2, wherein the step of providing a second wireless component includes providing a second wireless component having a first directional antenna connected to the first low power radio system and a second directional antenna connected to the second low power radio system.

6. A remote sensor interface, comprising:
   (a) a sensor input adapted to receive data from a sensor device;
   (b) a plurality of low power radio systems, each including:
      (i) a two-way wireless communication device, and
      (ii) a wake-up receiver; and
   (c) a controller, connected to each wake-up receiver to receive signals therefrom and further connected to each two-way wireless communications device to effect two-way communication therethrough, wherein the controller is adapted to select one of the plurality of two-way wireless communication devices for external two-way wireless communications, the selection being made on the basis of an electronic signal received from at least one of the plurality of wake-up receivers;
   (d) wherein the controller is adapted to wirelessly transmit data, received from the sensor device connected to the sensor input, via the selected two-way wireless communications device.

7. The remote sensor interface of claim 6, wherein the wake-up receiver is adapted to transmit the electronic signal only upon receiving a wake-up signal that includes a class designation corresponding to the remote sensor interface.

8. The remote sensor interface of claim 7, wherein the two-way wireless communication device is a standards based radio.

9. The remote sensor interface of claim 8, wherein the standards based radio is a Bluetooth radio.

10. The remote sensor interface of claim 7, wherein each low power radio system further includes a directional antenna, the directional antennas being arranged in an array to provide disparate, overlapping coverage zones.

11. A remote sensor interface link, comprising:
   (a) a plurality of low power radio systems, each including:
      (i) a two-way wireless communication device, and
      (ii) a wake-up receiver; and
   (b) a controller, connected to each wake-up receiver to receive signals therefrom and further connected to each two-way wireless communications device to effect two-way communication therethrough, wherein the controller is adapted to select one of the plurality of two-way wireless communication devices for external two-way wireless communications, the selection being made on the basis of an electronic signal received from at least one of the plurality of wake-up receivers;
   (c) wherein the controller is adapted to wirelessly transmit sensor data, received from a remote sensor interface, via the selected two-way wireless communications device.

12. The remote sensor interface of claim 11, wherein the wake-up receiver is adapted to transmit the electronic signal only upon receiving a wake-up signal that includes a class designation corresponding to the remote sensor interface.

13. The remote sensor interface of claim 12, wherein the two-way wireless communication device is a standards based radio.

14. The remote sensor interface of claim 13, wherein the standards based radio is a Bluetooth radio.

15. The remote sensor interface of claim 12, wherein each low power radio system further includes a directional antenna, the directional antennas being arranged in an array to provide disparate, overlapping coverage zones.

16. A wireless communication system, comprising:
   (a) a first wireless communication component;
   (b) a sensor device; and
   (c) a second wireless communication component, adapted to receive sensor data from at least one sensor device, including:
      (i) a plurality of low power radio systems, each having a two-way wireless communication device and a wake-up receiver, and
      (ii) a controller, connected to each wake-up receiver to receive signals therefrom and further connected to each two-way wireless communications device to effect two-way communication therethrough, wherein the controller is adapted to select one of the plurality of two-way wireless communication devices for two-way wireless communications with the first wireless communication component, the selection being made on the basis of an electronic signal received from at least one of the plurality of wake-up receivers,
      (iii) wherein the controller is adapted to wirelessly transmit sensor data, received from the sensor device, to the first wireless communication component via the selected two-way wireless communications device.

17. The remote sensor interface of claim 16, wherein the wake-up receiver is adapted to transmit the electronic signal only upon receiving a wake-up signal that includes a class designation corresponding to the remote sensor interface.

18. The wireless communication system of claim 17, wherein the first wireless communication component is a gateway controller.

19. The wireless communication system of claim 18, wherein the second wireless communication component is a remote sensor interface, and the sensor device communicates directly with the remote sensor interface.

20. The wireless communication system of claim 19, wherein the second wireless communication component is a remote sensor interface link, the wireless communication system further comprising a third wireless communication component, wherein the sensor device communicates indirectly with the remote sensor interface link via the third wireless communication component.

21. The wireless communication system of claim 20, wherein the third wireless communication component is a remote sensor interface, and wherein the sensor device communicates directly with the remote sensor interface.

22. The wireless communication system of claim 17, wherein the first wireless communication component is a remote sensor interface link.

23. The wireless communication system of claim 22, wherein the second wireless communication component is a remote sensor interface, and the sensor device communicates indirectly with the remote sensor interface link via the remote sensor interface.

24. The wireless communication system of claim 17, wherein the two-way wireless communication device is a standards based radio.

25. The wireless communication system of claim 24, wherein the standards based radio is a Bluetooth radio.

26. The wireless communication system of claim 17, wherein each low power radio system further includes a directional antenna, the directional antennas being arranged in an array to provide disparate, overlapping coverage zones.

* * * * *